(12) United States Patent  
Yamada et al.

(10) Patent No.: US 7,826,117 B2  
(45) Date of Patent: Nov. 2, 2010

(54) BEAM IRRADIATION APPARATUS

(75) Inventors: Masato Yamada, Inuyama (JP); Yoshihisa Suzuki, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 853 days.

(21) Appl. No.: 11/675,852

(22) Filed: Feb. 16, 2007

(65) Prior Publication Data

US 2007/0195393 A1   Aug. 23, 2007

(30) Foreign Application Priority Data

Feb. 20, 2006 (JP) .............................. 2006-041924  
Mar. 3, 2006 (JP) .............................. 2006-058578

(51) Int. Cl.  
*G02B 26/08* (2006.01)

(52) U.S. Cl. .................. 359/210.1; 359/209.1; 250/234

(58) Field of Classification Search .... 359/209.1–210.2  
See application file for complete search history.

(56) References Cited

U.S. PATENT DOCUMENTS 6,057,967 A * 5/2000 Takahashi et al. ........... 359/641  
7,182,463 B2 * 2/2007 Conner et al. ................. 353/31

FOREIGN PATENT DOCUMENTS

| JP | 58108038 | A | 6/1983 |
| JP | 650752 | A | 2/1994 |
| JP | 675298 | B2 | 9/1994 |
| JP | 11-083988 | | 3/1999 |
| JP | 2002131431 | A | 5/2002 |

OTHER PUBLICATIONS

Japanese Office Action for corresponding JP Application No. 2006-058578, May 26, 1926, Japan.

* cited by examiner

*Primary Examiner*—James Phan  
(74) *Attorney, Agent, or Firm*—Ditthavong, Mori & Steiner, P.C.

(57) ABSTRACT

An attachment lens is arranged in a stage subsequent to a scanning lens. After a laser beam is converged by the scanning lens, the laser beam is converted into a parallel beam by the attachment lens. When the scanning lens is displaced in a direction perpendicular to an optical axis of the laser beam, a traveling direction of the laser beam is bent by a predetermined angle immediately after the laser beam passes through the scanning lens. Then, the traveling direction of the laser beam is further bent by a predetermined angle in the same direction by the passage of the laser beam through the attachment lens. Accordingly, a final swing angle of the laser beam outgoing from an outgoing window is increased by a swing angle imparted by the attachment lens compared with the case where the attachment lens is not arranged. One of lens surfaces of the attachment lens is formed in a toroidal surface, which allows the laser beam to have a long outline in a vertical direction.

3 Claims, 14 Drawing Sheets

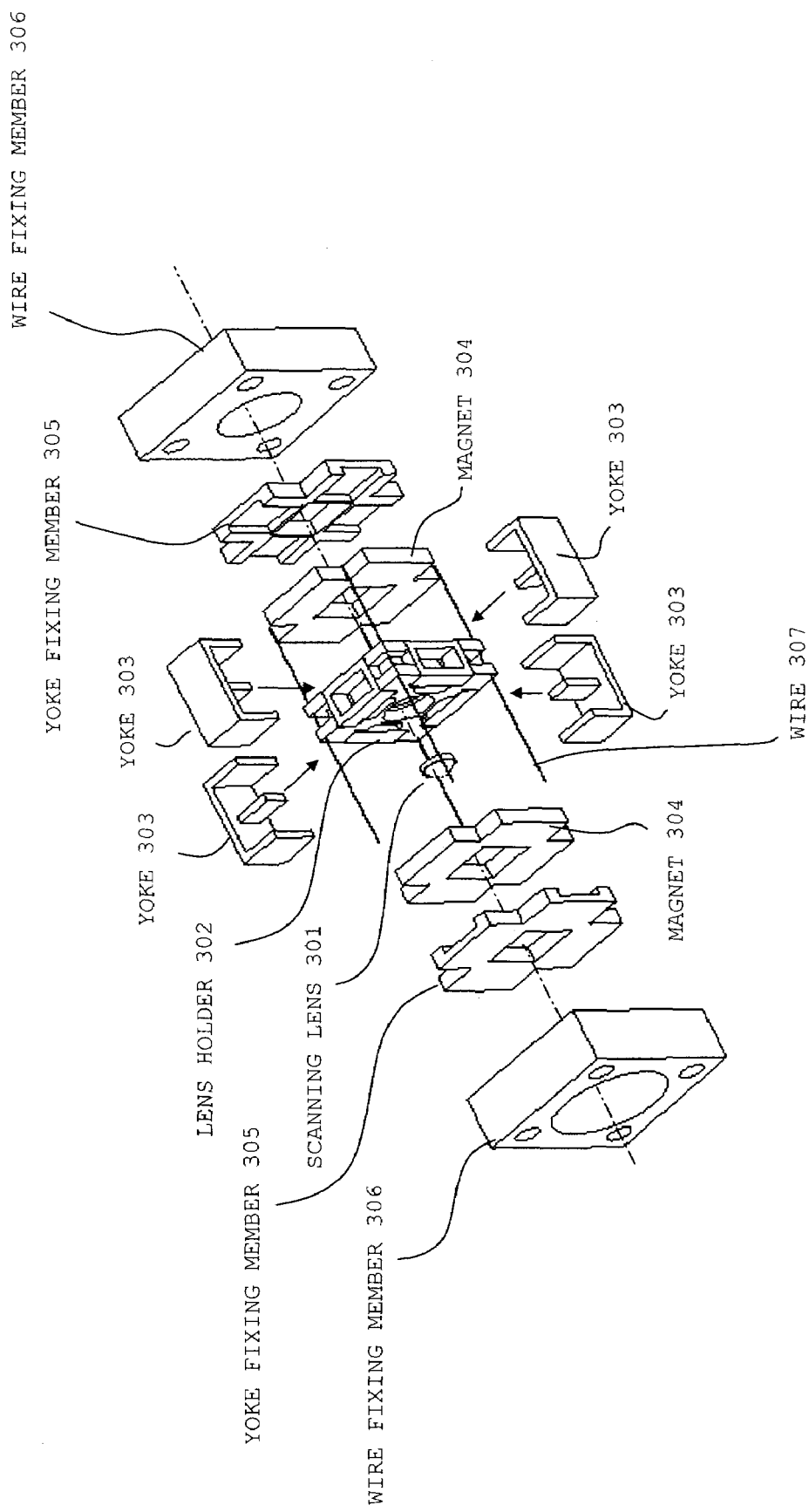

RAY TRACING OF SERVO SYSTEM

RAY TRACING OF SCANNING SYSTEM

POSITION-VOLTAGE CHARACTERISTIC

STRUCTURE OF PSD

FIG. 7A

IN CASE OF SCANNING ANGLE OF 0°

INTENSITY DISTRIBUTION | HORIZONTAL DIRECTION | VERTICAL DIRECTION

FIG. 7B

IN CASE OF SCANNING ANGLE OF 5°

INTENSITY DISTRIBUTION | HORIZONTAL DIRECTION | VERTICAL DIRECTION

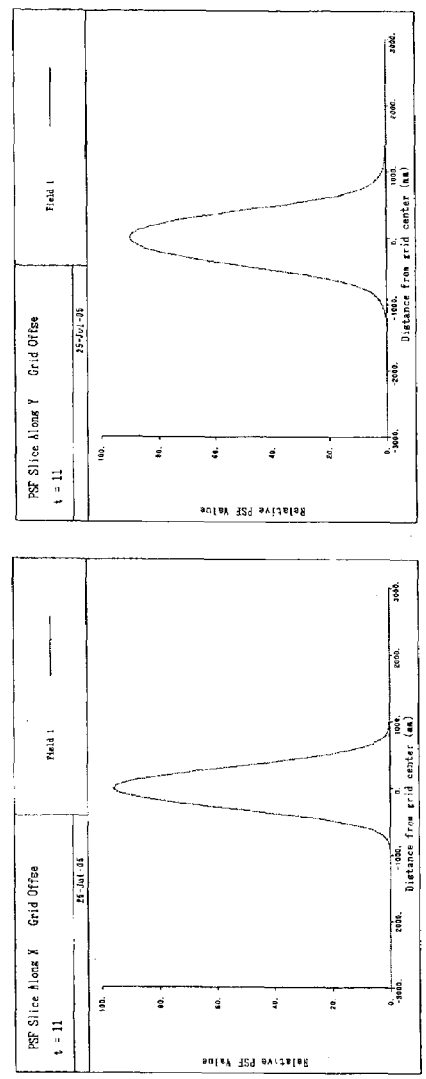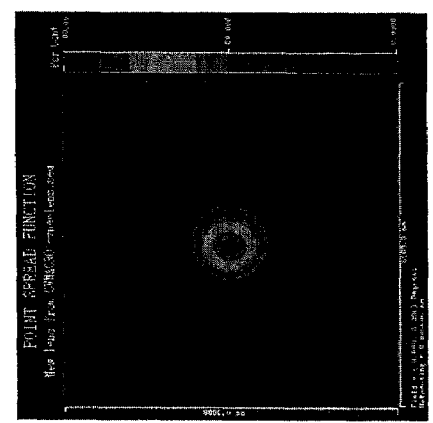
FIG. 8A
IN CASE OF SCANNING ANGLE OF 10°
FIG. 8B
IN CASE OF SCANNING ANGLE OF 15°

FIG.9
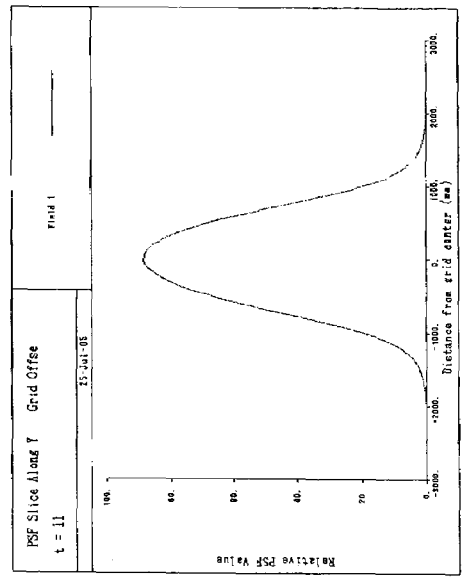
VERTICAL DIRECTION
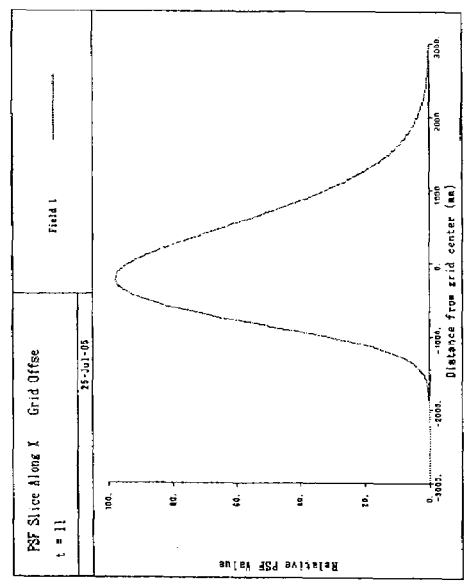
HORIZONTAL DIRECTION
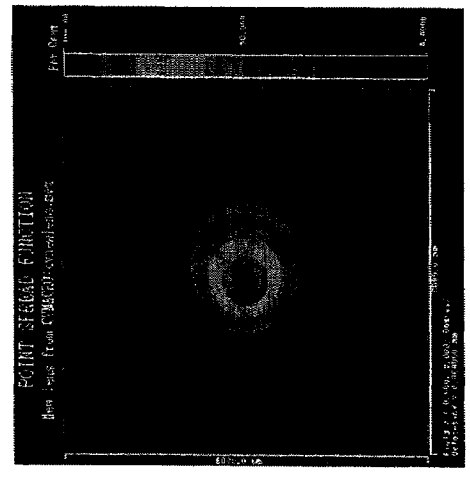
INTENSITY DISTRIBUTION
IN CASE OF SCANNING ANGLE OF 20°

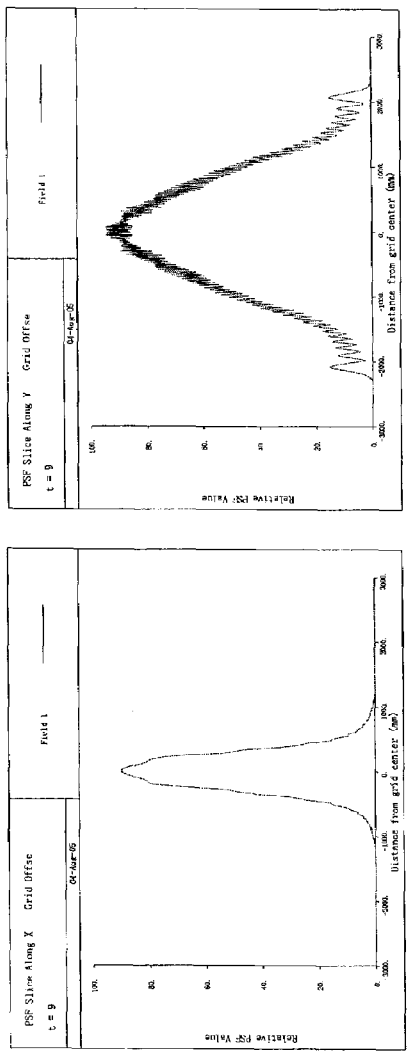
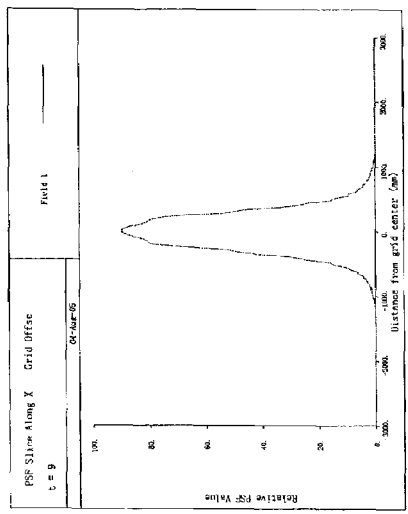
FIG.10A
IN CASE OF SCANNING ANGLE OF 0°
INTENSITY DISTRIBUTION
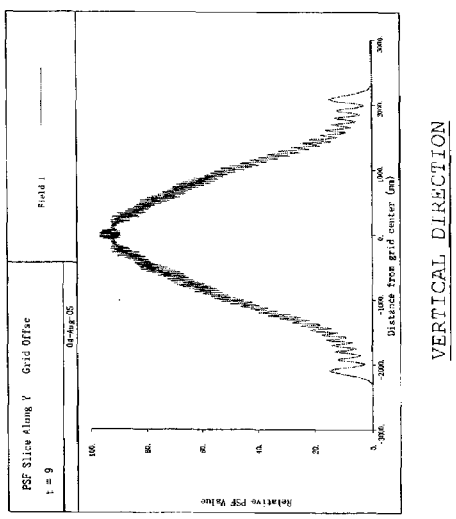
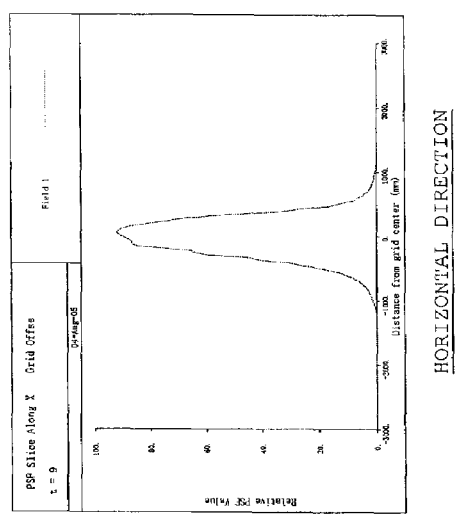
FIG.10B
IN CASE OF SCANNING ANGLE OF 5°
INTENSITY DISTRIBUTION

IN CASE OF SCANNING ANGLE OF 10°

HORIZONTAL DIRECTION

VERTICAL DIRECTION

INTENSITY DISTRIBUTION

IN CASE OF SCANNING ANGLE OF 15°

HORIZONTAL DIRECTION

VERTICAL DIRECTION

INTENSITY DISTRIBUTION

INCIDENCE PLANE IS FORMED
BY TOROIDAL SURFACE

BOTH INCIDENCE PLANE AND OUTGOING
PLACE ARE FORMED BY SPHERICAL SURFACES

BEAM IRRADIATION APPARATUS

This application claims priority under 35 U.S.C. Section 119 of Japanese Patent Application No. 2006-041924 filed Feb. 20, 2006 and Japanese Patent Application No. 2006-058578 filed Mar. 3, 2006.

BACKGROUND OF THE INVENTION

1. Field of the Invention

The present invention relates to a beam irradiation apparatus which is suitably used in an inter-vehicle distance detector, a distance detector, and the like.

2. Description of the Related Art

Recently, a detection apparatus in which a target region is irradiated with a laser beam to detect an obstacle within the target region is mounted on a passenger automobile. In such a detection apparatus, the laser beam is scanned in a horizontal direction and a vertical direction within the target region, and a distance between the automobile and the obstacle is detected from an acceptance state of the reflected light.

In order to scan the laser beam, a so-called beam irradiation apparatus is arranged in the detection apparatus. For example, a lens actuator disclosed in Japanese Patent Publication Laid-Open No. 11-83988 can be used to scan the laser beam. In the actuator, a scanning lens converts the laser beam (diffuse light) emitted from a light source into a parallel beam or a light beam slightly diffused rather than the parallel beam. The scanning lens is two-dimensionally driven in a direction perpendicular to an optical axis of the laser beam according to the drive of the actuator, which allows the laser beam to be scanned within the target region.

However, in the conventional technique, there is generated a problem a swing width of the laser beam is restricted by a drive amount of the actuator. Because the drive amount of the actuator has a predetermined restriction, in order to displace the scanning lens beyond the restriction, it is necessary to enlarge the actuator, or it is necessary to enhance drive force of an electromagnetic circuit including a magnet and a coil. However, the beam irradiation apparatus is therefore enlarged to generate a further problem that power consumption is increased.

In the conventional beam irradiation apparatus, generally the target region is divided into matrixes in the horizontal direction and the vertical direction, an outgoing level of the laser beam is enhanced in a pulsating manner at timing a scanning position of the laser beam reaches each grid position, and the grid position is irradiated with the laser beam. The detection whether or not the obstacle exists at the grid position is performed based on whether or not the light reflected from the target region is detected at each grid position, and a distance to the obstacle is detected based on a time difference between outgoing timing and acceptance timing of the laser beam.

In this case, resolution of the grid has an influence on accuracy of the obstacle detection. That is, as the resolution of the grid is enhanced, the accuracy of the obstacle detection is enhanced in the target region. At the same time, when the resolution of the grid is enhanced, an outgoing frequency of the laser beam is increased, which complicates scanning control. On the other hand, in the passenger automobile it is necessary that the detection accuracy in the horizontal direction be enhanced rather than the detection accuracy in the vertical direction. Accordingly, it is desirable that the resolution of the grid be enhanced in the horizontal direction while lowered in the vertical direction.

SUMMARY OF THE INVENTION

In view of the foregoing, a first object of the invention is to provide a beam irradiation apparatus which can increase the swing width of the laser beam with a simple configuration while a displacement amount of the scanning lens is suppressed to a small level. A second object of the invention is to provide a beam irradiation apparatus which can irradiate the laser beam having a proper outline according to the resolution of the grid.

A beam irradiation apparatus according to a first aspect of the invention realizes the first object, by including a light source which emits a laser beam; a scanning unit which displaces a traveling direction of the laser beam emitted from the light source toward a direction perpendicular to an optical axis of the laser beam; and a lens element which imparts wide angle action to a swing angle of the optical axis, the swing angle being generated by the scanning unit.

In the beam irradiation apparatus according to the first aspect of the invention, the scanning unit may be configured to displace the laser beam in a first direction and a second direction, the first direction being perpendicular to the optical axis, and the second direction being perpendicular to both the first direction and the optical axis, and the lens element may be configured to impart the wide angle action to the laser beam in at least one of the first direction and the second direction.

According to the beam irradiation apparatus of the first aspect, the swing width in scanning the laser beam can be increased by the wide angle action imparted by the lens element.

The beam irradiation apparatus according to the first aspect of the invention is implemented by the following first embodiment. In the embodiment, the scanning unit in the first aspect corresponds to a scanning lens 301 and lens actuator 300 or a polygon mirror 900, and the lens element in the first aspect corresponds to an attachment lens 700.

A beam irradiation apparatus according to a second aspect of the invention realizes the first object by including a light source which emits a laser beam; a first lens which displaces a traveling direction of the laser beam emitted from the light source toward a direction perpendicular to an optical axis of the laser beam; an actuator which drives the first lens; and a second lens which imparts wide angle action to a swing angle of the optical axis, the swing angle being generated by displacing the first lens.

In the beam irradiation apparatus according to the second aspect of the invention, the first lens may be configured to converge the laser beam smaller than a parallel beam, and the second lens may be configured to diffuse the laser beam converged by the first lens into a substantially parallel state.

In the beam irradiation apparatus according to the second aspect of the invention, the actuator may be configured to two-dimensionally drive the first lens in a first direction and a second direction, the first direction being perpendicular to the optical axis of the laser beam, and the second direction being perpendicular to both the first direction and the optical axis, and the second lens may be configured to impart the wide angle action to the laser beam in at least one of the first direction and the second direction.

According to the beam irradiation apparatus of the second aspect, the swing width in scanning the laser beam can be increased by the wide angle action imparted by the second lens. For example, in a case where a beam diameter (by ray tracing) of the laser beam outgoing from the second lens is 1/n times the beam diameter (also by ray tracing) incident to the first lens while the laser beam outgoing from the second lens is the parallel beam, scanning can be performed with the laser beam having the swing width n times that of a case where the second lens is not used.

The beam irradiation apparatus according to the second aspect of the invention is implemented by the following second embodiment. In the embodiment, the first lens in the second aspect corresponds to the scanning lens 301, the actuator in the second aspect corresponds to the lens actuator 300 or the polygon mirror 900, and the second lens in the second aspect corresponds to the attachment lens 700.

A beam irradiation apparatus according to a third aspect of the invention realizes the second object by including a light source which emits a laser beam; a scanning unit which scans the laser beam emitted from the light source within a target region; and an optical member which deforms an outline of the laser beam in the target region so as to become thin in one direction.

In the beam irradiation apparatus according to the third aspect of the invention, the scanning unit may be configured to scan the laser beam in at least a horizontal direction within the target region, and the optical member may be configured to deform the outline of the laser beam in the target region so as to become thin in a direction perpendicular to the horizontal direction.

According to the beam irradiation apparatus of the third aspect, the outline of the laser beam on the target region is adjusted so as to become thin in one direction by the optical action imparted by the optical member. Accordingly, as described above, the target region can be irradiated with the laser beam having the outline suitable to the grid shape, even if the resolution of the grid set in the target region is changed. Therefore, the beam irradiation apparatus according to the third aspect of the invention can efficiently and stably realize the scanning operation.

The beam irradiation apparatus according to the third aspect of the invention is implemented by the following second embodiment. In the embodiment, the scanning unit in the third aspect corresponds to the scanning lens 301 and the lens actuator 300 or the polygon mirror 900, and the optical member in the third aspect corresponds to the attachment lens 700.

However, the invention is illustrated by the following embodiments only by way of example, and the invention is not limited to the embodiments.

BRIEF DESCRIPTION OF THE DRAWINGS

Other objects and novel features of the invention will become apparent from the following description of embodiments with reference to the accompanying drawings in which:

FIG. 2 shows a configuration of a lens actuator in the first embodiment;

FIGS. 7A and 7B show an intensity distribution of a laser beam when an irradiation laser beam in the first embodiment is displaced;

FIGS. 8A and 8B show the intensity distribution of the laser beam when the irradiation laser beam in the first embodiment is displaced;

FIG. 9 shows the intensity distribution of the laser beam when the irradiation laser beam in the first embodiment is displaced;

FIGS. 10A and 10B show the intensity distribution of the laser beam when the irradiation laser beam in a second embodiment is displaced;

However, these drawings are used only for the description of specific embodiments by way of example, and the invention is not limited to the drawings.

DESCRIPTION OF PREFERRED EMBODIMENTS

Preferred embodiments of the invention will be described below with reference to the drawings.

First Embodiment

Figure 1:
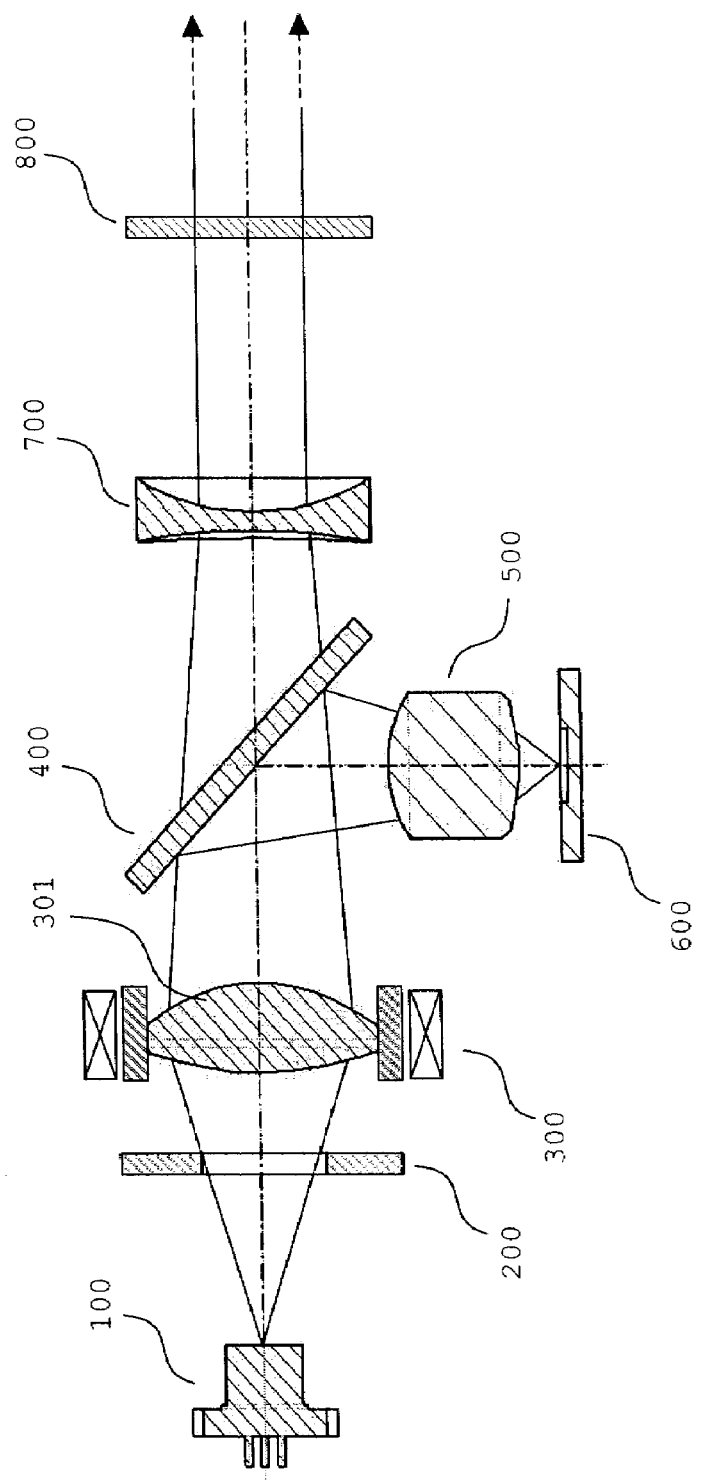
FIG. 1 shows a configuration of a beam irradiation apparatus according to a first embodiment of the invention.

FIG. 1 shows a configuration of a beam irradiation apparatus according to a first embodiment of the invention. FIG. 1 shows only a head portion (beam irradiation head) of the beam irradiation apparatus, and a configuration of a control circuit is neglected in FIG. 1.

The beam irradiation head includes a semiconductor laser 100, an aperture 200, a lens actuator 300, a beam splitter 400, a servo lens 500, a PSD (Position Sensitive Detector) 600, an attachment lens 700, and an outgoing window 800.

The laser beam emitted from the semiconductor laser 100 is shaped in a desired shape by the aperture 200, and the laser beam is incident to a scanning lens 301. The scanning lens 301 includes a convex lens having aspheric surfaces, and the scanning lens 301 forms the laser beam incident from the semiconductor laser 100 into the convergent beam smaller than a parallel beam. The scanning lens 301 is supported by a lens actuator 300 so as to be able to be displaced in a Y-Z plane of FIG. 1. In the laser beam which passes already through the scanning lens 301, an output angle is changed in the Y-Z plane according to drive of the lens actuator 300. The scanning lens 301 is adjusted by the lens actuator 300 such that a center axis of the scanning lens 301 is aligned with a center axis of the attachment lens 700 when the scanning lens 301 is located at a neutral position.

A part of the laser beam is reflected and separated from the laser beam (hereinafter referred to as "irradiation laser beam"), with which a target region is irradiated, by the beam splitter 400 after the laser beam passes through the scanning lens 301. The separated laser beam (hereinafter referred to as "separated beam") is converged on the PSD 600 through the servo lens (convergent lens) 500.

The PSD 600 has an acceptance surface parallel to an X-Y plane of FIG. 1, and the PSD 600 outputs a current according to a convergent position of the separated beam on the acceptance surface. At this point, the convergent position of the separated beam on the acceptance surface corresponds one-on-one to an irradiation position of the irradiation laser beam on the target region. Therefore, the output current from the PSD 600 corresponds to the irradiation position of the irradiation laser beam on the target region.

A signal processing circuit (not shown) processes the current signal, and the irradiation position of the irradiation laser beam. The scanning of the irradiation laser beam is controlled based on the detection result. The configuration and the current output operation of the PSD 600 will be described later with reference to FIGS. 4, 5A and 5B.

The irradiation laser beam passing through the beam splitter 400 is incident to the attachment lens 700. The attachment lens 700 includes a concave lens which imparts diffusion action to the laser beam in an all-around direction. The attachment lens 700 converts the irradiation laser beam, which is inputted as the convergent beam, into the parallel beam. The irradiation laser beam converted into the parallel beam by the attachment lens 700 passes through the outgoing window 800, and the target region is irradiated with the irradiation laser beam.

FIG. 2 shows a configuration (exploded perspective view) of the lens actuator 300.

Referring to FIG. 2, the scanning lens 301 is placed in an opening of a central portion of a lens holder 302. Coils are attached to for side faces of the lens holder 302 respectively, and a projection portion in the center of a yoke 303 is into each coil from each arrow direction. Tongue pieces on both sides of each yoke 303 are fitted in recesses of a pair of yoke fixing members 305. A magnet 304 is fixed to each yoke fixing member 305 such that the tongue piece of the yoke 303 is sandwiched between the magnet 304 and the yoke fixing member 305. In this state of things, the yoke fixing member 305 is attached to a base (not shown) along with the magnet 304.

A pair of wire fixing members 306 is also attached to the base to elastically support the lens holder 302 through wires 307. Holes through which the wires 307 are fitted respectively are made in four corners of the lens holder 302. After the wire 307 is fitted through the hole, both ends of the wire 307 are fixed the wire fixing members 306 respectively. Therefore, the wire fixing member 306 elastically supports the lens holder 302 through the wires 307.

In driving the lens actuator 300, an actuator drive circuit supplies drive signals to the coils attached to the lens holder 302, which generates electromagnetic force to two-dimensionally drive the scanning lens 301 along with the lens holder.

Figure 3B:
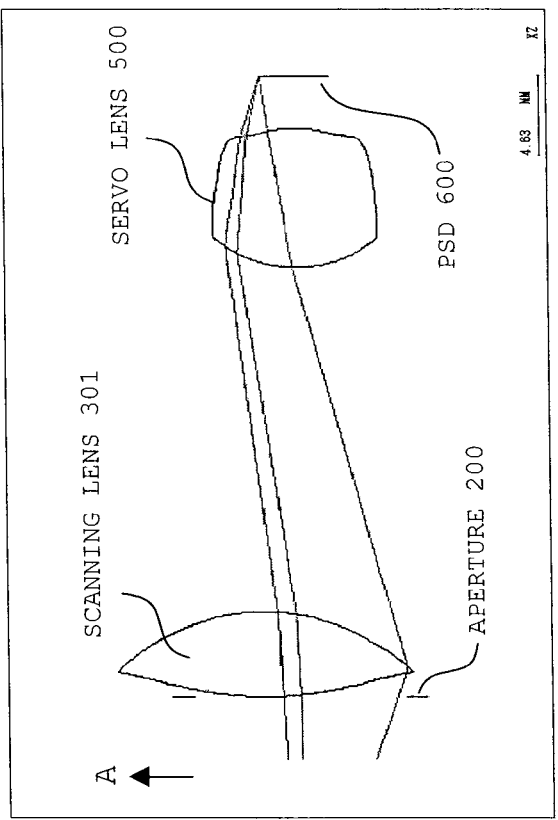
FIGS. 3A and 3B show simulation results of behaviors in which an irradiation laser beam and a separated beam are swung respectively when a scanning lens 301 is displaced in one direction in the first embodiment.
Figure 3A:
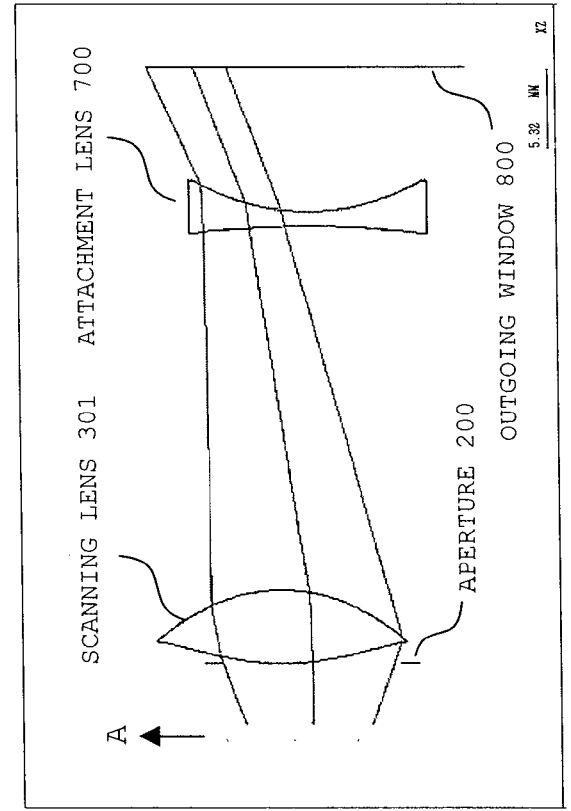

FIG. 3A shows a simulation result performed by ray tracing for a behavior in which the irradiation laser beam is swung when the scanning lens 301 is displaced in a direction of an arrow A. FIG. 3B shows a simulation result performed by the ray tracing for a behavior in which the separated beam is swung when the scanning lens 301 is displaced in the same direction (direction of the arrow A). FIG. 3B shows only a trajectory of the laser beam incident to the servo lens 500.

As shown in FIG. 3A, a traveling direction of the irradiation laser beam is bent by a predetermined angle immediately after the irradiation laser beam passes through the scanning lens by displacing the scanning lens 301. Then, the irradiation laser beam passes through the attachment lens 700, which further bends the traveling direction by a predetermined angle toward the same direction. Accordingly, the final swing angle of the irradiation laser beam outgoing from the outgoing window 800 becomes larger by the swing angle imparted by the attachment lens 700 when compared with the case where the attachment lens 700 is not arranged. Because the attachment lens 700 includes the concave lens which imparts the diffusion action to the laser beam in the all-around direction, the swing-angle increased effect (wide angle action) is also generated in the all-around direction of the attachment lens 700. The swing-angle increased effect (wide angle action) will be described later with reference to FIG. 6.

Figure 4:
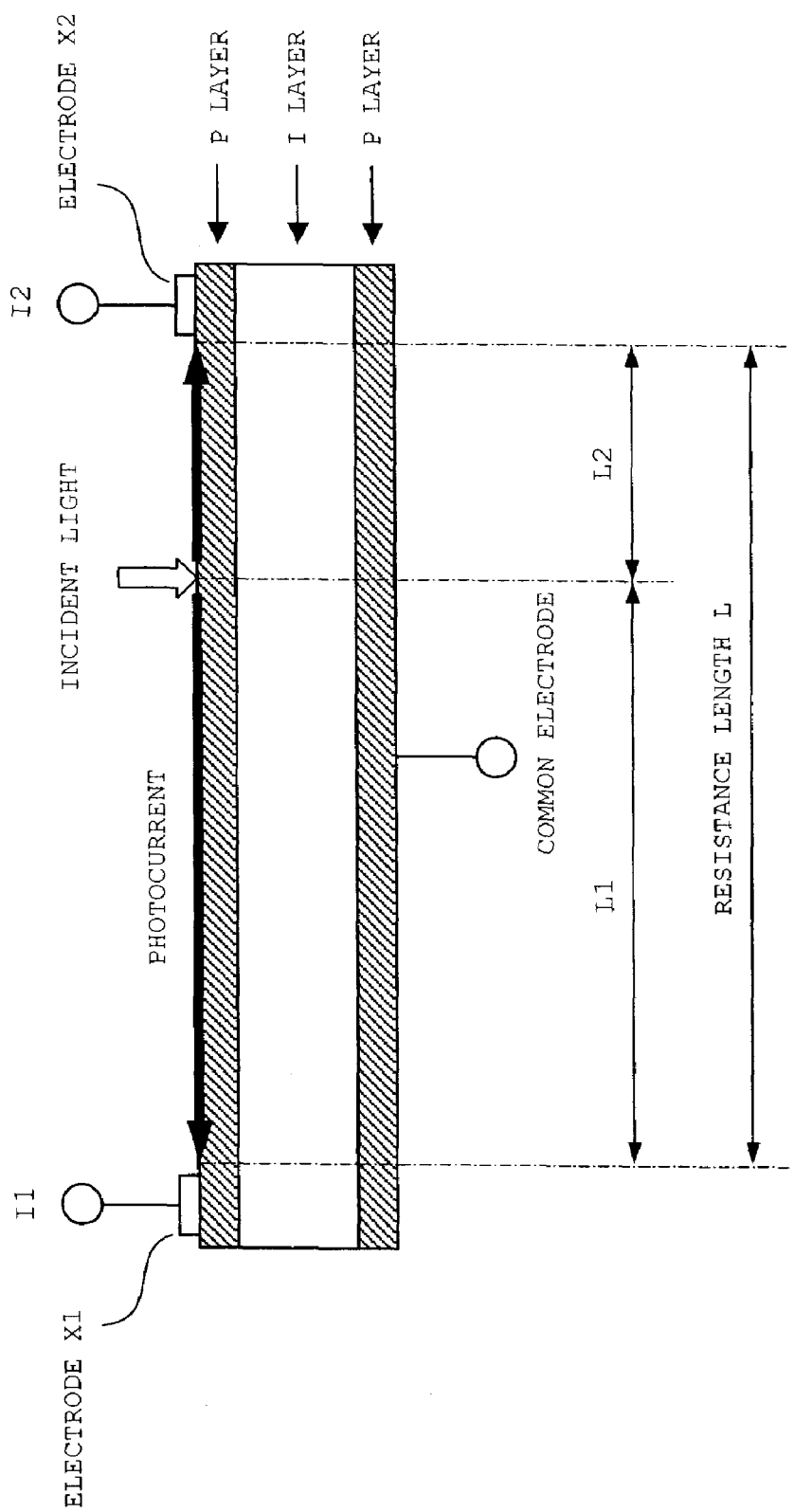
FIG. 4 shows a structure of a PSD of the first embodiment.

FIG. 4 shows the structure of the PSD 600. FIG. 4 shows the structure of the PSD 600 when viewed from the Y-axis direction of FIG. 1.

As shown in FIG. 4, the PSD 600 has a structure in which a P-type resistance layer is formed on a surface of an N-type high-resistance silicon substrate. The P-type resistance layer acts as both the acceptance surface and the resistance layer. Electrodes X1 and X2 and electrodes Y1 and Y2 (not shown in FIG. 4) are formed on the surface of the resistance layer. The electrodes X1 and X2 output a photocurrent in the X-direction of FIG. 1, and the electrodes Y1 and Y2 output a photocurrent in the Y-direction of FIG. 1. A common electrode is formed in the backside.

When the separated beam is converged onto the acceptance surface, a charge is generated at the convergent position according to a light quantity. The charge in the form of the photocurrent reaches the resistance layer, and the charge is divided in inverse proportion to a distance to each of the electrodes X1, X2, Y1, and Y2 and delivered from the electrodes. Each of the currents delivered from the electrodes X1, X2, Y1, and Y2 has a magnitude divided in inverse proportion to the distance to each electrode from the convergent position of the separated beam. Therefore, the convergent position can be detected on the acceptance surface based on the currents delivered from the electrodes X1, X2, Y1, and Y2.

Figure 5B:
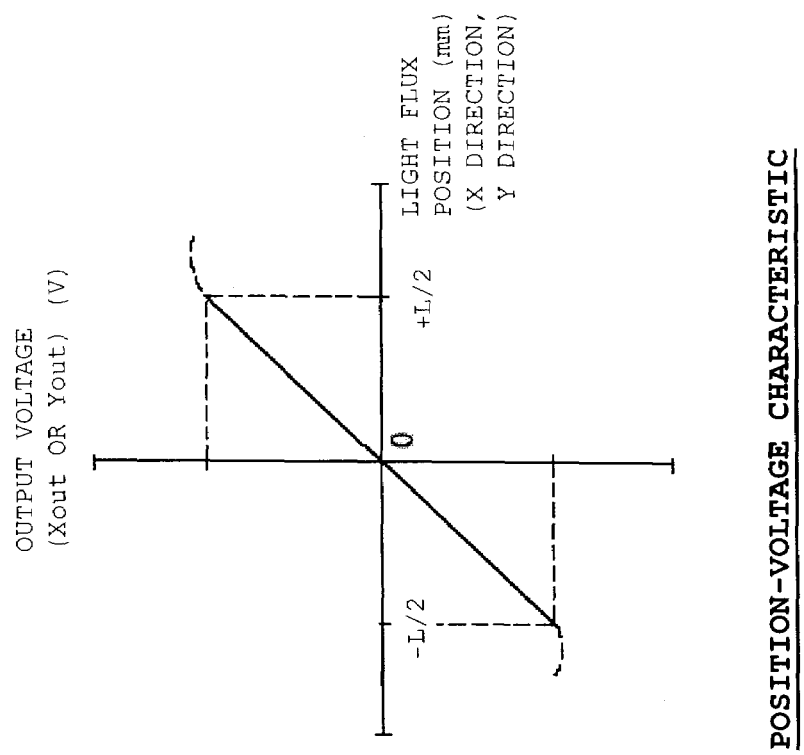
FIGS. 5A and 5B show the structure and a voltage characteristic of the PSD in the first embodiment respectively.
Figure 5A:
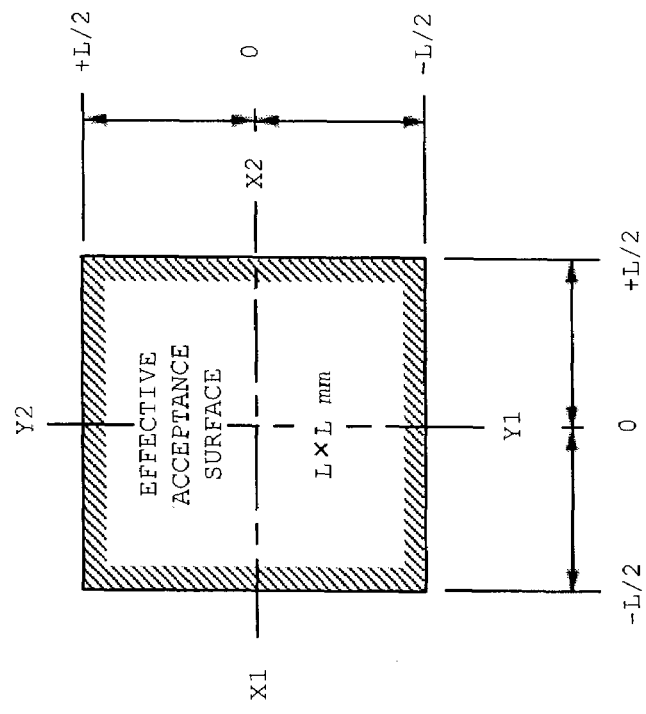

FIG. 5A shows the effective acceptance surface of the PSD 600. FIG. 5B shows a relationship between the separated-beam convergent position on the effective acceptance surface and a position detection voltage which is generated by a PSD signal processing circuit based on the currents obtained from the electrodes X1, X2, Y1, and Y2. In FIG. 5A, the effective acceptance surface is formed in a square shape. FIG. 5B shows the relationship between an output voltage and displacement amount in the X-direction and Y-direction of the convergent position with respect to a reference position while a center position on the effective acceptance surface is set to the reference position (zero position).

The signal processing circuit generates a voltage Xout corresponding to the displacement amount in the X-direction of the convergent position and a voltage Yout corresponding to the displacement amount in the Y-direction based on the currents delivered from the electrodes X1, X2, Y1, and Y2, and the signal processing circuit outputs the voltages Xout and Yout to a DSP (Digital Signal Processor) control circuit through an ADC (Analog Digital Converter). The DSP control circuit detects the displacement amounts in the X-direction and Y-direction of the convergent position from the inputted voltages Xout and Yout.

Figure 6:
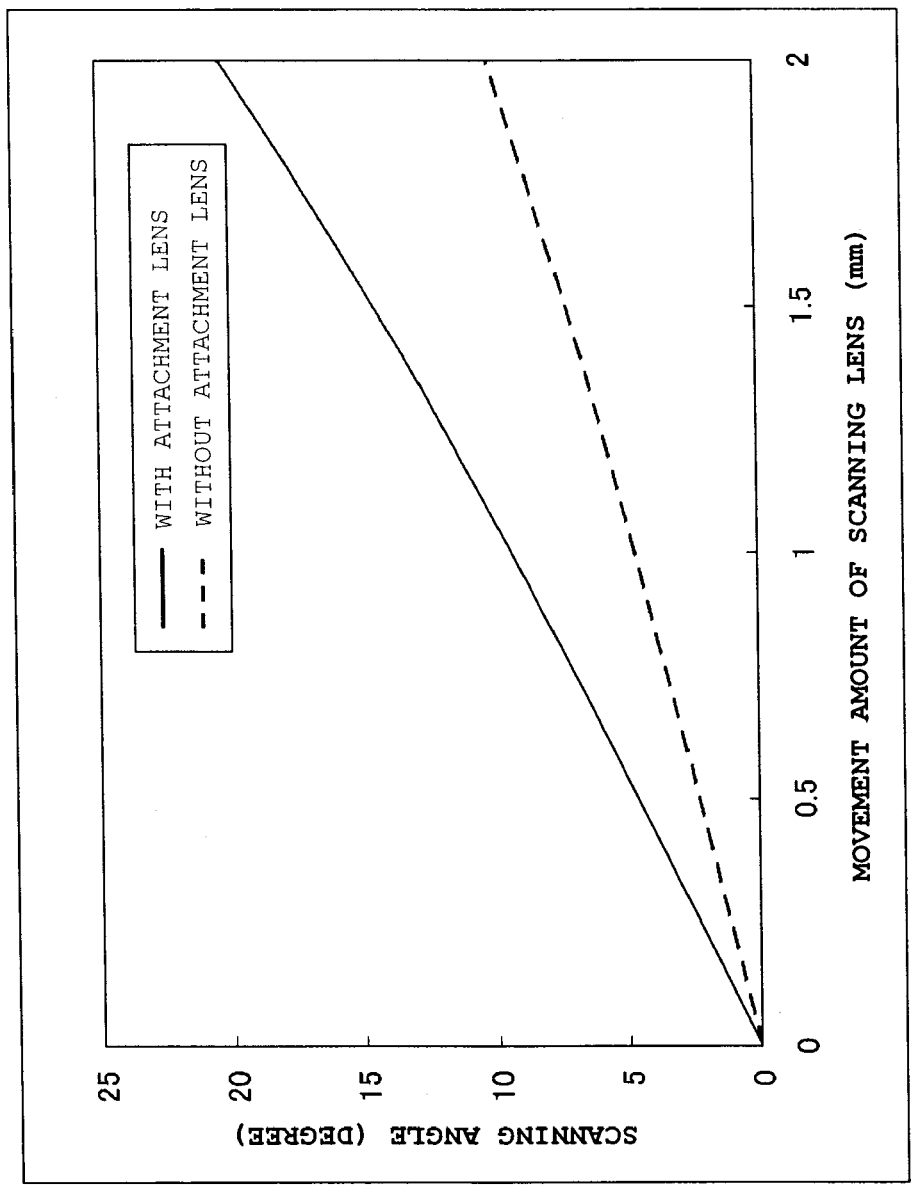
FIG. 6 shows a relationship between a movement amount of a scanning lens and a scanning angle in the first embodiment.
Figure 11A:
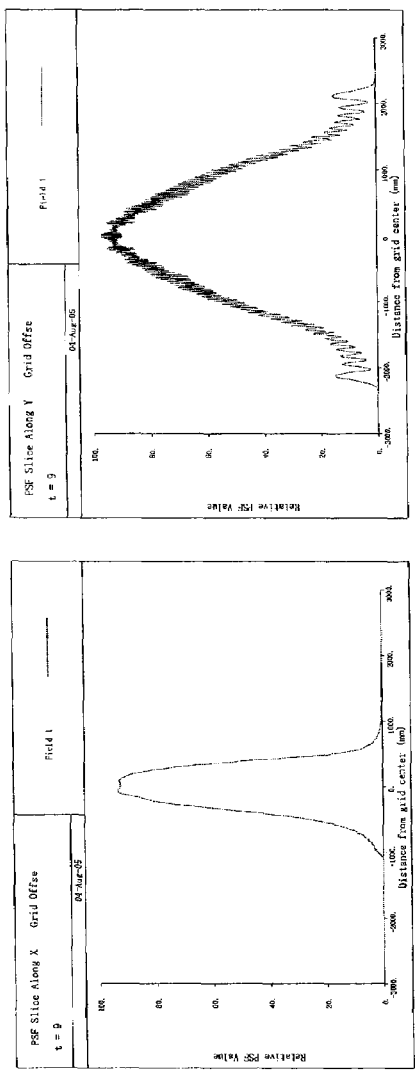
FIGS. 11A and 11B show the intensity distribution of the laser beam when the irradiation laser beam in the second embodiment is displaced.
Figure 11B:
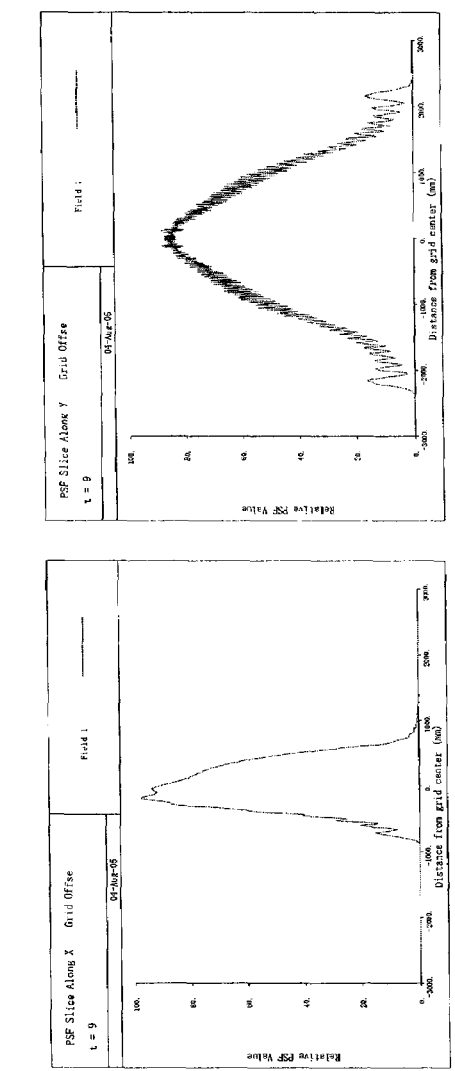
Figure 12:
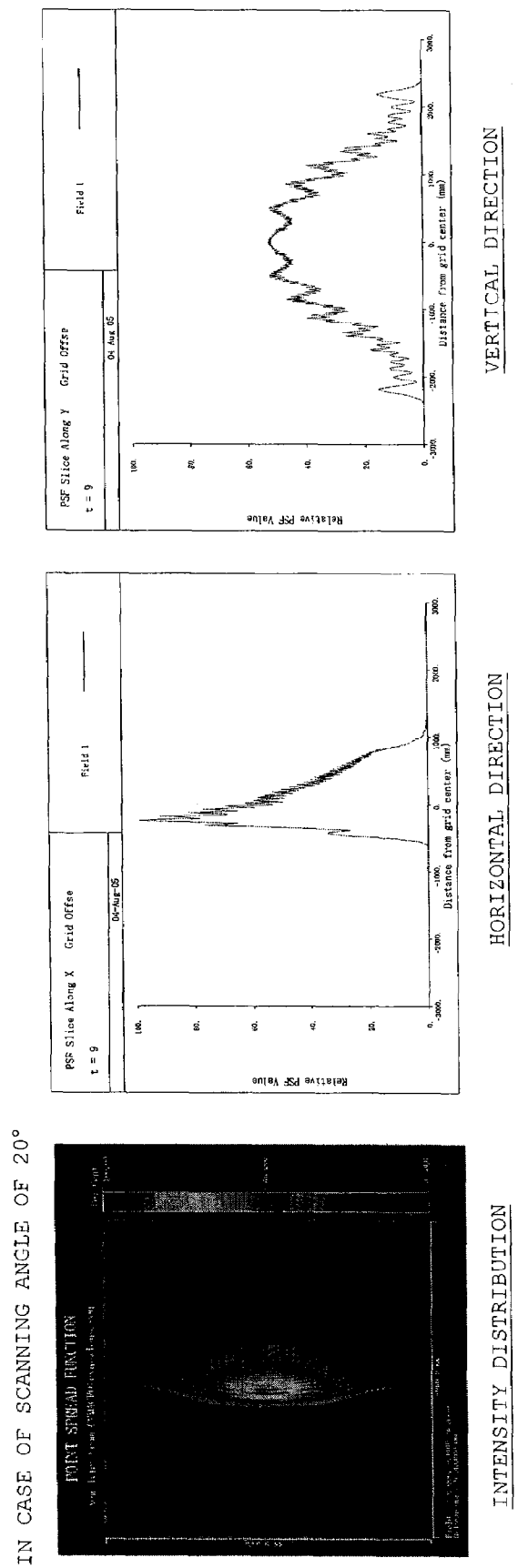
FIG. 12 shows the intensity distribution of the laser beam when the irradiation laser beam in the second embodiment is displaced.

FIG. 6 shows a result in which a relationship between a movement amount of the scanning lens 301 and a scanning angle of the irradiation laser beam is simulated under constant conditions in the configuration of FIG. 1. The scanning angle of a vertical axis is one which is formed between the optical axis of the laser beam emitted from the semiconductor laser 100 and the optical axis of the laser beam outgoing from the outgoing window 800. FIG. 6 also shows a relationship between the movement amount of scanning lens 301 and the scanning angle when the attachment lens 700 is neglected as a comparative example.

The simulation conditions are as follows.

(Scanning Lens 301)

double-aspheric surface
focal distance: 13.4912 mm
effective diameter: φ16 mm (aperture)
center thickness: 5 mm
refractive index: 1.517
(Attachment Lens 700)
incident side: spherical surface/
outgoing side: spherical surface
focal distance: −23.0474 mm
effective diameter: φ14.0 mm
center thickness: 1 mm
refractive index: 1.517
(Other)
distance between semiconductor laser and attachment lens: 52.81 mm
displacement amount of scanning lens: ±2 mm It is assumed that the scanning lens 301 and the attachment lens 700 are arranged at the positions where the laser beam outgoing from the attachment lens 700 becomes the parallel beam and the beam diameter (by the ray tracing) outgoing from the attachment lens 700 becomes a half of the beam diameter (by the ray tracing) incident to the scanning lens 301 when the center axes of the scanning lens 301 and attachment lens 700 are aligned with each other, namely, when the scanning lens 301 is located at the neutral position.

As shown in FIG. 6, when the above-described design example (simulation conditions) is adopted, the double scanning angle can be obtained at each scanning lens position compared with the comparative example. That is, according to the design example, even if the scanning lens 301 is displaced lesser, the scanning can be performed with the irradiation laser beam having the large swing angle.

Each lens suitable to the simulation conditions can be formed based on the following lens data.

(Scanning Lens 301)

a. Incidence Plane (Aspheric Surface)
   curvature radius 16.8777649771835 mm
   aspherical coefficient (aspheric surface generation polynomial):

| conical constant (K) | −8.48832199279343 |
| fourth-order coefficient (A) | −4.27096033316007e−007 |
| sixth-order coefficient (B) | 1.17521904684828e−006 |
| eighth-order coefficient (C) | −2.111559547426e−008 | b. Outgoing Plane (Aspheric Surface)
   curvature radius −10.4603963534906 mm
   aspherical coefficient (aspheric surface generation polynomial):

| conical constant (K) | 0.0947470811575341 |
| fourth-order coefficient (A) | 7.4254388113816e−005 |
| sixth-order coefficient (B) | 2.33700944147862e−006 |
| eighth-order coefficient (C) | −1.55061157703029e−008 | c. Material: glass/BK7 (refractive index=1.517)

(Attachment Lens 701)

a. Incidence Plane (Spherical Surface)
   curvature radius −60.3114453703036 mm b. Outgoing Plane (Spherical Surface)
   curvature radius 14.68847686175 mm c. Distance between Center Surfaces 1 mm d. Material glass/BK7 (refractive index=1.517)

The above simulation is performed on the conditions that, when the scanning lens 301 is located at the neutral position, the laser beam outgoing from the attachment lens 700 becomes the parallel beam and the beam diameter (by the ray tracing) outgoing from the attachment lens 700 becomes a half of the beam diameter (also by the ray tracing) incident to the scanning lens 301. However, in the case where conditions are set to the optical system such that a beam diameter (by the ray tracing) of the laser beam outgoing from the attachment lens 700 is 1/n times the beam diameter (also by the ray tracing) incident to the scanning lens 301, the scanning can be performed with the irradiation laser beam having the swing angle n times that of the comparative example. That is, the smaller is decreased the beam diameter of the laser beam outgoing from the attachment lens 700, the larger is increased the swing angle of the irradiation laser beam to the displacement amount of the scanning lens 301.

However, when the beam diameter of the laser beam outgoing from the attachment lens 700 is excessively decreased, scattering is generated in the irradiation laser beam by a water droplet or dust adhering to the outgoing window 800, which results in a problem that the target region is not smoothly irradiated with the irradiation laser beam. Accordingly, when the laser beam is incident to the scanning lens 301, it is necessary that the beam diameter be set to an adequate size in consideration of both the adverse affect of the water droplet or dust and the swing angle necessary to the scanning of the irradiation laser beam.

In the case where the simulation conditions are set to the optical system, because the sufficiently large beam diameter is obtained, the target region can smoothly be irradiated with the irradiation laser beam without generating the adverse affect of the water droplet or dust.

In the first embodiment, when the scanning lens is displaced from the neutral position, aberration is generated according to the difference between the center axis of the scanning lens and the optical axis of the incident laser beam. FIGS. 7A, 7B, 8A, 8B, and 9 show simulation results in which a generation state (intensity distribution) of the aberration is simulated when the scanning lens 301 is displaced while the simulation conditions are set to the optical system. The intensity distribution shown in FIGS. 7A, 7B, 8A, 8B, and 9 is one in the case where the intensity distribution of the irradiation laser beam is obtained in the target region positioned 100 m away from the attachment lens 700.

Each of FIGS. 7A, 7B, 8A, 8B, and 9 shows a beam intensity distribution (left) when the irradiation laser beam is swung by a predetermined angle in the horizontal direction while the scanning lens is displaced, a beam profile (middle) in the horizontal direction (horizontal direction of the drawing) with respect to each beam intensity distribution, and a beam profile (right) in the vertical direction (vertical direction of the drawing). The horizontal axis of the beam profile is a distance from the beam center position (where the beam intensity is the highest), and the vertical axis is an intensity level when the maximum intensity is set to 100. In the horizontal axis, the beam center position is set to zero.

As can be seen from FIGS. 7A, 7B, 8A, 8B, and 9, in the case where the simulation conditions are set to the optical system, the generation of the aberration becomes conspicuous from around the position where the irradiation laser beam is scanned by about 15° from the neutral position (see FIG. 8B), and the intensity distribution of the irradiation laser beam becomes distorted in the horizontal direction. When the scanning angle becomes about 20° (see FIG. 9), the distortion of the intensity distribution becomes significant. The distortion is also generated when the irradiation laser beam is scanned in the vertical direction.

In order to decrease the distortion, it is necessary that the surface of the scanning lens 301 or attachment lens 700 be set to be able to suppress the aberration generated by the displacement of the scanning lens, or it is necessary that a correction lens be separately arranged in an optical path to suppress the aberration. On the apparatus side in which the beam irradiation apparatus of the first embodiment is mounted, when the distortion of the intensity distribution becomes troublesome, it is necessary that the distortion be decreased by such countermeasures.

Although the embodiment (first embodiment) of the invention described above, the invention is not limited to the first embodiment, but various modifications could be made.

In the first embodiment, the attachment lens 700 is formed by the concave lens which imparts the wide angle action to the laser beam in all-around direction. However, for example, in the attachment lens 700, a lens which imparts the wide angle action to the laser beam only in one direction may appropriately be arranged in place of the concave lens. In this case, in the configuration of FIG. 1, the attachment lens 700 is arranged such that the direction of the wide angle action is aligned with either the Z-axis direction or the Y-axis direction of FIG. 1.

For example, in the case where the direction of the wide angle action of the attachment lens 700 is aligned with the Z-axis direction of FIG. 1, the scanning angle of the irradiation laser beam is amplified by the wide angle action of the attachment lens 700 only when the scanning lens 301 is displaced in the Z-axis direction. In this case, even if the scanning lens 301 is displaced in the Y-axis direction, the wide angle action of the attachment lens 700 has no influence on the scanning angle of the irradiation laser beam, but the scanning angle of the irradiation laser beam is generated only by the displacement of the scanning lens 301.

In such cases, the lens surfaces of the scanning lens 301 may be formed such that the laser beam is further converged from the parallel beam in the Z-axis direction of FIG. 1 while the laser beam is set to the parallel beam in the Y-axis direction of FIG. 1. The lens surfaces of the attachment lens 700 may be formed such that the convergent state in the Z-axis direction which is imparted by the scanning lens is converted into the parallel beam. This enables the irradiation laser beam to be set to the parallel beam after the irradiation laser beam passes through the attachment lens 700.

The modification is an effective example particularly in the case where the large scanning range is ensured in one direction. For example, in the case where the beam irradiation apparatus is mounted on the vehicle, it is necessary that the large scanning range be set in the horizontal direction rather than the vertical direction to rapidly detect an obstacle lateral to the vehicle or jump from the side. The modification is suitable to such situations.

In the modification, because the degree of the change in scanning angle in the Z-axis direction is larger than the degree of the change in scanning angle in the Y-axis direction, it is desirable that the separated beam converged on the PSD 600 be moved on the acceptance surface so as to reflect the degree of the change. Accordingly, in the modification, it is desirable that the lens surfaces of the servo lens 500 be designed such that the convergent position of the separated beam is moved on the acceptance surface.

Second Embodiment

In configuration of the first embodiment, both the incidence plane and outgoing plane of the attachment lens 700 are formed in the spherical surface, and the uniform diffusion action is imparted to the laser beam in the all-around direction. However, a function of adjusting the beam shape of the irradiation laser beam can be imparted to one of the incidence plane and the outgoing plane. For example, one of the incidence plane and the outgoing plane is formed in a toroidal surface, and the irradiation laser beam can be formed in the beam shape thinner than that of the first embodiment.

FIGS. 10A, 10B, 11A, 11B, and 12 show simulation results in the case where the incidence plane of the attachment lens 700 is set to a toroidal surface. The intensity distribution of the irradiation laser beam is simulated when the scanning lens 301 is displaced while the following conditions are set to the optical system. The intensity distribution shown in FIGS. 10A, 10B, 11A, 11B, and 12 is one in the case where the intensity distribution of the irradiation laser beam is obtained in the target region positioned 100 m away from the attachment lens 700.

(Scanning Lens 301)
double-aspheric surface
focal distance: 13.4912 mm
effective diameter: φ16 mm (aperture)
center thickness: 5 mm
refractive index: 1.517
(Attachment Lens 700)
incident side: toroidal surface/
outgoing side: spherical surface
focal distance: horizontal direction −23.0359 mm, vertical direction −20.9278 mm
effective diameter: φ14.0 mm
center thickness: 1 mm
refractive index: 1.517

(Other)
distance between semiconductor laser and attachment lens: 52.81 mm
displacement amount of scanning lens: ±2 mm It is assumed that the scanning lens 301 and the attachment lens 700 are arranged at the positions where the laser beam outgoing from the attachment lens 700 becomes the parallel beam in the horizontal direction and the beam diameter (by the ray tracing) outgoing from the attachment lens 700 becomes a half of the beam diameter (also by the ray tracing) incident to the scanning lens 301 in the horizontal direction when the center axes of the scanning lens 301 and attachment lens 700 are aligned with each other, namely, when the scanning lens 301 is located at the neutral position.

Each of FIGS. 10A, 10B, 11A, 11B, and 12 shows a beam intensity distribution (left) when the irradiation laser beam is swung by a predetermined angle in the horizontal direction by displacing the scanning lens 301 in the horizontal direction (Z-axis direction of FIG. 1), a beam profile (middle) in the horizontal direction (horizontal direction of the drawing) with respect to each beam intensity distribution, and a beam profile (right) in the vertical direction (vertical direction of the drawing). The horizontal axis of the beam profile is a distance from the beam center position (where the beam intensity is the highest), and the vertical axis is an intensity level when the maximum intensity is set to 100. In the horizontal axis, the beam center position is set to zero.

Figure 13B:
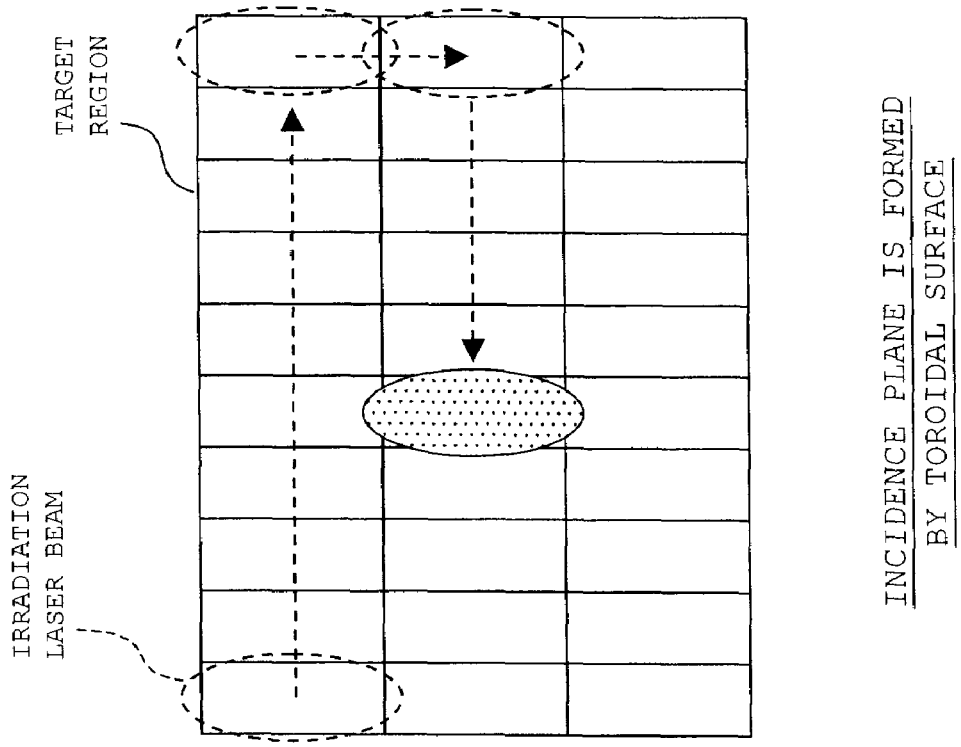
FIGS. 13A and 13B show examples of a scanning orbit and a state of the irradiation laser beam in the second embodiment.
Figure 13A:
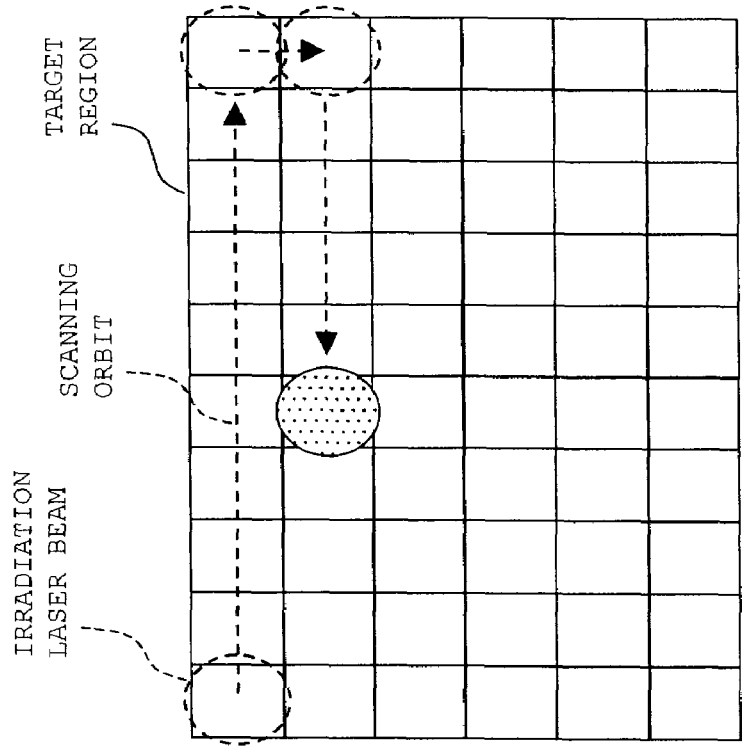

As can be seen from FIGS. 10A, 10B, 11A, 11B, and 12, the incidence plane of the attachment lens 700 is formed in the toroidal surface, which allows the irradiation laser beam to be formed in the beam shape thinner than that of the first embodiment in the vertical direction (Y-axis direction of FIG. 1). As a result, when compared with the first embodiment, the vertical coverage of the irradiation laser beam can be widened, and resolution can be enhanced in the horizontal direction. In the case where the configuration is applied to the in-vehicle obstacle detection apparatus, as shown in FIG. 13B, the number of scanning stages (the number of blocks when the target region is divided into matrixes) in the vertical direction can be decreased in the target region, and the scanning resolution can be enhanced in the horizontal direction. Therefore, the scanning control can be simplified and the detection accuracy can be improved in the horizontal direction. FIG. 13A shows the beam shape and the divided state of the target region in the case where both the incidence plane and outgoing plane of the attachment lens 700 are formed in the spherical surface.

The attachment lens 700 suitable to the simulation conditions can be formed based on the following lens data. The lens data for the scanning lens 301 is similar to that of the simulation of the first embodiment, so that the description will be neglected.

(Attachment Lens 701)

a. Incidence Plane (Toroidal Surface)
    curvature radius:
        horizontal direction −60.16068895769 mm −vertical direction −40 mm b. Outgoing Plane (Spherical Surface)
    curvature radius 14.68847686175 mm c. Material: glass/BK7 (refractive index=1.517)

According to the simulation conditions, the same wide angle action as that of FIG. 6 can be realized.

As can be seen from FIGS. 10A, 10B, 11A, 11B, and 12, as with the first embodiment, the aberration is also generated in the irradiation laser beam according to the simulation conditions. In the case where the simulation conditions are set to the optical system, the generation of the aberration becomes conspicuous from around the position where the irradiation laser beam is scanned by about 15° from the neutral position (see FIG. 11B), and the intensity distribution of the irradiation laser beam becomes distorted in the horizontal direction. When the scanning angle becomes about 20° (see FIG. 12), the distortion of the intensity distribution becomes significant. The distortion is also generated when the irradiation laser beam is scanned in the vertical direction.

In order to decrease the distortion, it is necessary that the surface of the scanning lens 301 be set to be able to suppress the aberration generated by the displacement of the scanning lens, or it is necessary that a correction lens be separately arranged in an optical path to suppress the aberration. On the apparatus side in which the beam irradiation apparatus of the second embodiment is mounted, when the distortion of the intensity distribution becomes troublesome, it is necessary that the distortion be decreased by such countermeasures.

In the in-vehicle beam irradiation apparatus, generally because the laser-beam swing angle of about ±10 degrees is necessary in the horizontal direction to monitor the front of the vehicle, unless the aberration is conspicuous when the swing angle is within the ±10 degrees, there is generated no problem in the accuracy of the inter-vehicular distance detecting operation. Accordingly, in the optical system designed according to the simulation conditions is mounted on the in-vehicle beam irradiation apparatus, the problem-free scanning operation can be realized without separately adding the aberration correction lens.

Thus, the shaping effect of the irradiation laser beam can be obtained as well as the wide angle effect by adjusting the surface shape of the attachment lens 700. That is, both the swing-angle increased effect and the scanning control simplification effect can simultaneously obtained by the simple configuration.

Although the second embodiment of the invention described above, the invention is not limited to the second embodiment, but various modifications could be made.

Although the incidence plane of the attachment lens 700 is formed in the toroidal surface in the second embodiment, the incidence plane may be formed in the cylindrical surface in place of the toroidal surface. In this case, it is necessary that the orientation of the cylindrical surface be adjusted such that the beam shape becomes thin in the desired direction in the target region. It is also necessary that the surface shapes of the cylindrical surface (incidence plane) and spherical surface (outgoing plane) be designed such that the beam becomes the desired size in the target region.

In the second embodiment, the beam shape is adjusted by devising the incidence plane of the attachment lens 700. Alternatively, a lens may separately be added to the optical system to adjust the beam shape. However, in this case, the number of components is increased and the cost is increased.

Figure 14:
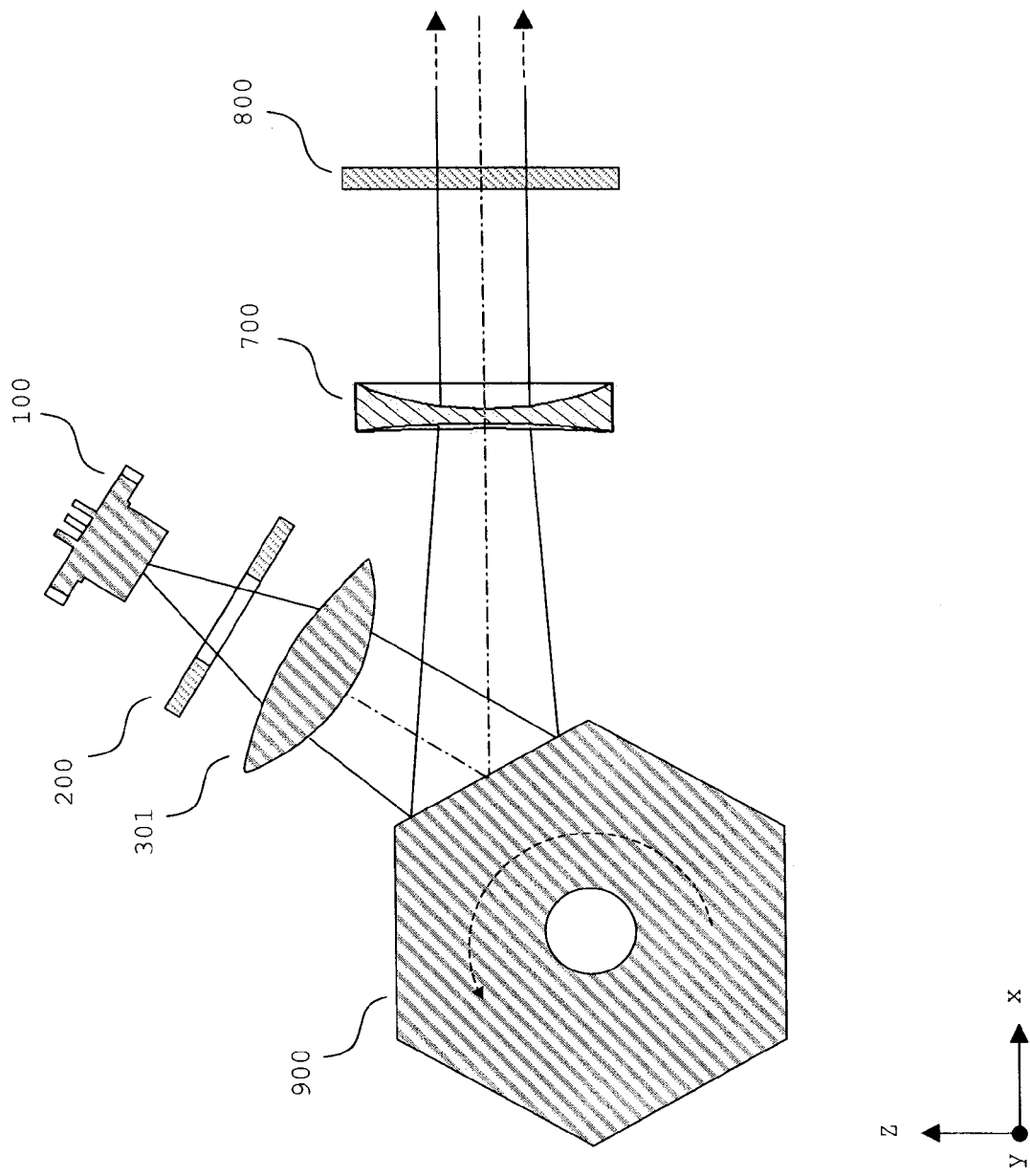
FIG. 14 shows a configuration of a beam irradiation apparatus according to a modification.

In the first and second embodiments, the lens actuator 300 is used as the beam scanning means. Alternatively, as shown in FIG. 14, the beam may be scanned using a polygon mirror 900.

The polygon mirror 900 has a polygon in cross section, and a mirror surface is formed in each side face. The polygon mirror 900 is rotated in the arrow direction in FIG. 14 by receiving drive force from a motor (not shown). When the side face is irradiated with the laser beam while polygon mirror 900 is rotated, the incidence angle of the laser beam is changed with respect to each side face. Therefore, the laser beam (irradiation laser beam) reflected by the side face of the polygon mirror 900 is scanned in the rotational direction of the polygon mirror 900.

In the polygon mirror 900, an inclination angle of each mirror surface is adjusted with respect to a rotating axis such that a scanning orbit in the horizontal direction is shifted by one block in the vertical direction on the target region by transferring the incidence position of the laser beam from one mirror surface to the next mirror surface. In the case where the scanning orbit in the horizontal direction is located at the lowermost block position, when the incidence position of the laser beam is transferred to the next mirror surface, the inclination angle of the mirror surface is adjusted such that the scanning orbit in the horizontal direction is shifted from the lowermost block position to the uppermost block position.

The inclination angle of the mirror surface of the polygon mirror 900 is adjusted as described above, which allows the irradiation laser beam to scan the irradiation block shown in FIG. 13B step by step from the left to the right according to the rotation of the polygon mirror 900.

In this case, the beam splitter 400, the servo lens 500, and a PSD 600 can be neglected in FIG. 1. This is because the irradiation position of the laser beam can be detected from the rotational position of the polygon mirror 900. In the configuration of FIG. 14, the rotational position of the polygon mirror 900 is sequentially detected based on a rotating synchronous signal delivered from the motor, and the irradiation position of the irradiation laser beam is detected on the target region based on the detected rotational position.

Additionally, the laser beam can be scanned using a galvano-mirror and a MEMS (Micro Electro Mechanical Systems) mirror.

The beam irradiation apparatus of the invention can be applied to a variety of uses in addition to the in-vehicle use. The beam irradiation apparatus of the invention can be mounted on an image reading apparatus and the like in addition to the obstacle detection apparatus and the distance detection apparatus.

Various changes and modifications of the above embodiments could appropriately be made without departing from the technical thought shown in claims.

What is claimed is:

1. A beam irradiation apparatus comprising:
    a light source which emits a laser beam;
    a first lens which displaces a traveling direction of the laser beam emitted from the light source toward a direction perpendicular to an optical axis of the laser beam;
    an actuator which drives the first lens;
    a second lens which imparts wide angle action to a swing angle of the optical axis, the swing angle being generated by displacing the first lens;
    a beam dividing element which divides the laser beam passing through the first lens into a first light beam and a second light beam, the first light beam traveling toward the second lens, the second light beam traveling toward a direction different from the first light beam;
    a position sensor which receives the second light beam divided by the beam dividing element and outputs a signal according to an irradiation position of the laser beam passing through the second lens; and
    a third lens which is arranged between the position sensor and the beam dividing element to converge the second light beam onto the position sensor.

2. The beam irradiation apparatus according to claim 1, wherein
    the first lens converges the laser beam smaller than a parallel beam, and
    the second lens diffuses the laser beam converged by the first lens into a substantially parallel state.

3. The beam irradiation apparatus according to claim 1, wherein
    the actuator two-dimensionally drives the first lens in a first direction and a second direction, the first direction being perpendicular to the optical axis of the laser beam, and the second direction being perpendicular to both the first direction and the optical axis, and
    the second lens imparts the wide angle action to the laser beam in at least one of the first direction and the second direction.

* * * * *